US009412395B1

(12) United States Patent
Story, Jr. et al.

(10) Patent No.: US 9,412,395 B1
(45) Date of Patent: Aug. 9, 2016

(54) NARRATOR SELECTION BY COMPARISON TO PREFERRED RECORDING FEATURES

(71) Applicant: Audible, Inc., Newark, NJ (US)

(72) Inventors: Guy Ashley Story, Jr., New York, NY (US); Jason Ojalvo, New York, NY (US); Andrew Alexander Grathwohl, Brooklyn, NY (US)

(73) Assignee: Audible, Inc., Newark, NJ (US)

( * ) Notice: Subject to any disclaimer, the term of this patent is extended or adjusted under 35 U.S.C. 154(b) by 0 days.

(21) Appl. No.: 14/503,084

(22) Filed: Sep. 30, 2014

(51) Int. Cl.

| | |
|---|---|
| ***G10L 15/00*** | (2013.01) |
| ***G10L 25/60*** | (2013.01) |
| ***G10L 15/18*** | (2013.01) |
| ***G10L 15/22*** | (2006.01) |
| ***G10L 25/18*** | (2013.01) |
| ***G10L 15/10*** | (2006.01) |

(52) U.S. Cl.
CPC ................. *G10L 25/60* (2013.01); *G10L 15/10* (2013.01); *G10L 15/1807* (2013.01); *G10L 15/22* (2013.01); *G10L 25/18* (2013.01)

(58) Field of Classification Search
None
See application file for complete search history.

(56) References Cited

U.S. PATENT DOCUMENTS

2002/0087555 A1* 7/2002 Murata ..................... G06F 3/16
2014/0136194 A1* 5/2014 Warford .................. G10L 17/02
704/233

* cited by examiner

*Primary Examiner* — Qian Yang
(74) *Attorney, Agent, or Firm* — Knobbe, Martens, Olson & Bear, LLP

(57) ABSTRACT

A content exchange server facilitates the identification of potential narrators of content. The content exchange server receives audio samples from narrators and extracts recording features of the narrators from the samples, which can be associated with narrator profiles. A rights holder can submit preferred recording features for a work to the content exchange server. The content exchange server can compare the preferred focal features with the recording features extracted from the voice samples of the potential narrators to identify potential narrators for the work.

24 Claims, 5 Drawing Sheets

NARRATOR SELECTION BY COMPARISON TO PREFERRED RECORDING FEATURES

BACKGROUND

Producers or rights holders of media content can spend significant amounts of time identifying a narrator (also referred to as a voice actor actress) for their work or content. Often, the rights holder has an idea for the type of voice he or she likes and listens to auditions for the voice that most closely resembles the desired sound. In some cases, the rights holder listens to a large number of auditions from many potential narrators to find the desired sound. For example, the rights owner may be looking for a high-pitched, female voice with a southern accent or the rights owner may be looking for a voice that sounds like John Wayne from "True Grit." In such cases, the rights holder listens to the auditions to find the right "fit." However, selecting a narrator for a work in this manner can be imprecise and time-consuming.

BRIEF DESCRIPTION OF THE DRAWINGS

The foregoing aspects and many of the attendant advantages will become more readily appreciated as the same become better understood by reference to the following detailed description, when taken in conjunction with the accompanying drawings.

DETAILED DESCRIPTION

Figure 1:
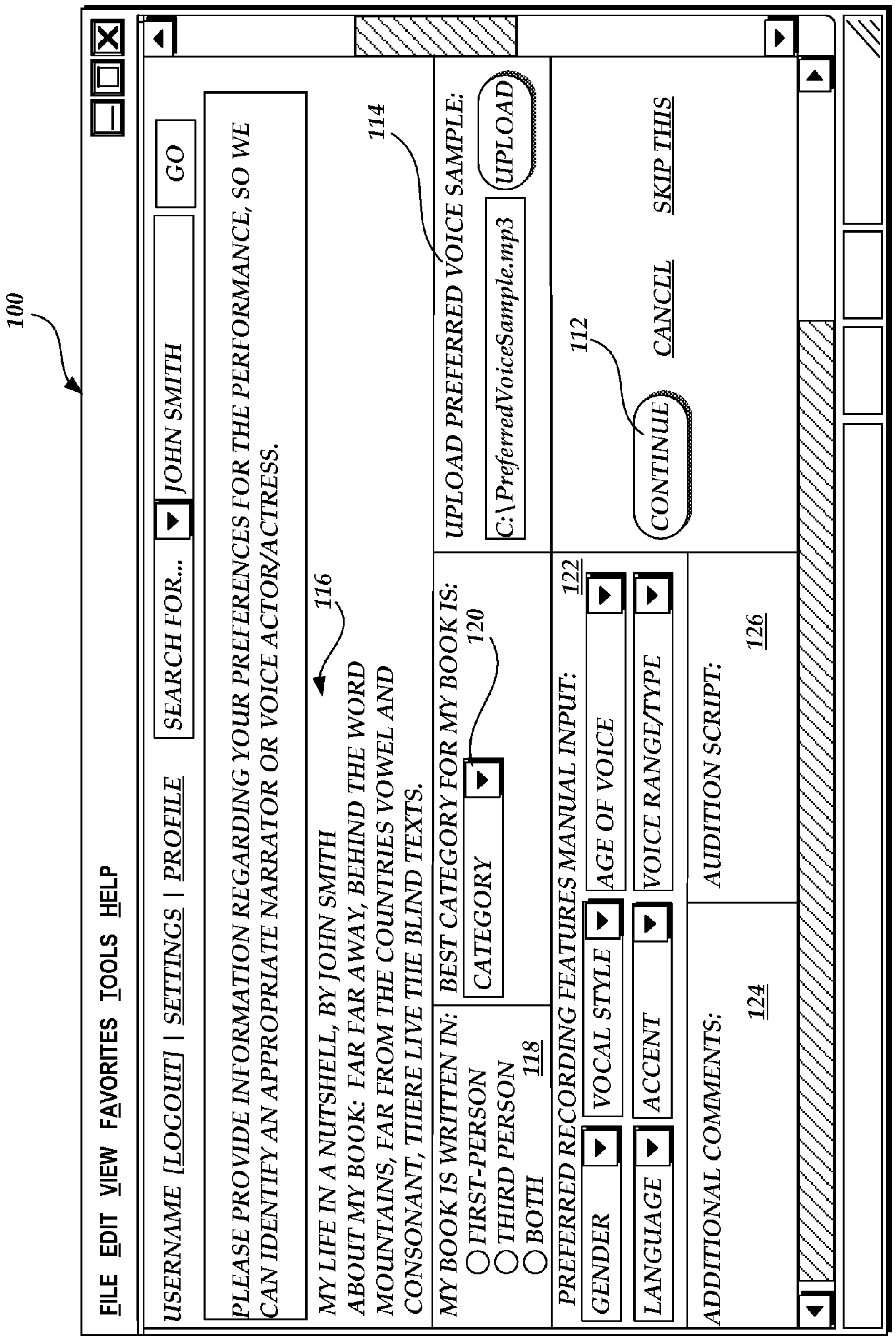
FIG. 1 depicts an illustrative user interface presented to a rights holder that provides information regarding preferred vocal features for a narrator.

Generally described, aspects of the present disclosure relate to a content exchange server that facilitates selection of narrators by holders of rights in content, such as a book, film, commercial, etc. The content exchange server receives preferences from the rights holder and uses voice recognition techniques to identify narrators that meet the preferences of the rights holder.

As a non-limiting example, a rights holder can upload one or more audio clips that include the rights holder's desired "sound." For example, the audio clips may include a clip of Robert DeNiro from "Goodfellas," Susan Sarandon from "The Client," and/or Bill Cosby from "The Cosby Show." Alternatively, or in addition, the rights holder can identify preferences for the vocal features of the narrator, such as gender, voice type (bass, baritone, alto, soprano), accent, style (e.g., mystery, horror, children, humor, poetry, motivational speech, corporate speech, narration, etc.), or other recording features, such as setting features and/or production quality features, etc.

The content exchange server can analyze the voice in the audio clip or use the selected preferences to identify preferred recording features for the potential narrator. When the recording preferences are selected, the content exchange server can convert the recording preferences to quantitative units for analysis. For example, the gender and/or voice type can be converted to a frequency range, the accent can be converted to a corresponding prosodic feature, etc.

When an audio clip is provided, the content exchange server 204 can use voice identification techniques to parse out the preferred vocal features, and other preferred recording features. For example, the content exchange server can use Fourier transforms, bandpass filters, vector quantization, Gaussian mixture modeling, neural networks, and/or support vector machine, etc., to identify short-term spectral features, voice source features, spectro-temporal features, prosodic features, and/or high-level features from the preferred voice sample. In some instances, these features can include, but are not limited to, timbre, intonation, rhythm, glottal pulse shape, fundamental frequency, speaking rate, accent, pronunciation, etc.

In addition to the preferred recording features, the content exchange server can store recording features from various narrators that have been extracted from voice samples of the narrators, or otherwise obtained. In some cases, the content exchange server includes multiple voice samples for a narrator, and can extract the recording features from each sample. While some of the recording features in different samples from the same narrator may stay the same, such as fundamental frequency, etc., other recording features may change, such as accent, background noise, sound quality, or speaking rate. Accordingly, each voice sample can be associated with its own recording features, and multiple voice samples can be associated with each narrator.

The content exchange server can compare the preferred recording features with the recording features of the narrators to identify a list of potential narrators. For example, if timbre, fundamental frequency, and accent are being used as the recording features, the content exchange server can compare the timbre, fundamental frequency and accent from the preferred voice sample with the timbre, fundamental frequency and accent from the voice samples of the narrators. Narrators with recording features that are similar to the preferred recording features can be identified as the potential narrators.

In some instances, the potential narrators are different from the voices that correspond to the preferred voice samples. For example, with reference again to the audio clips of Robert DeNiro, Susan Sarandon, or Bill Cosby, the content exchange server can provide a list of narrators that sound like Robert DeNiro from "Goodfellas," Susan Sarandon from "The Client," and/or Bill Cosby from "The Cosby Show," but are not Robert DeNiro, Susan Sarandon, or Bill Cosby.

In addition, the content exchange server can account for any rights holder's preferences regarding one recording feature being more important than another recording feature in identifying potential narrators. For example, if Robert DeNiro's accent is the most important recording feature, the content exchange server can consider this when identifying potential narrators.

Once identified, the content exchange server can provide the list of potential narrators to the rights holder. Additionally, the content exchange server can provide relevant voice samples of the potential narrators for review by the rights holder. In this manner, the content exchange server can analyze the potential narrators using objective criteria to more accurately and efficiently identify potential narrators. Additionally, the content exchange server can review more potential narrators than would otherwise be possible by the rights holder.

FIG. 1 depicts an illustrative user interface 100 for prompting a rights holder to input data regarding preferred recording features for a narrator of content. For illustrative purposes, the content is a book (either in physical or e-book form) that the rights holder would like to have produced as an audio book. However, those skilled in the art will appreciate that this is a non-limiting example of the application of the content exchange server.

As shown in FIG. 1, the rights holder may select or enter a title of the work or content from a user interface that she would like to have produced. As used herein, the term "content title" is simply a designation that identifies the content to be produced and is often used herein interchangeably with the term "content." A content title could be used to represent content such as a book, a musical recording, a film, a software program, a video game, commercial, sound recording, etc.

Figure 2:
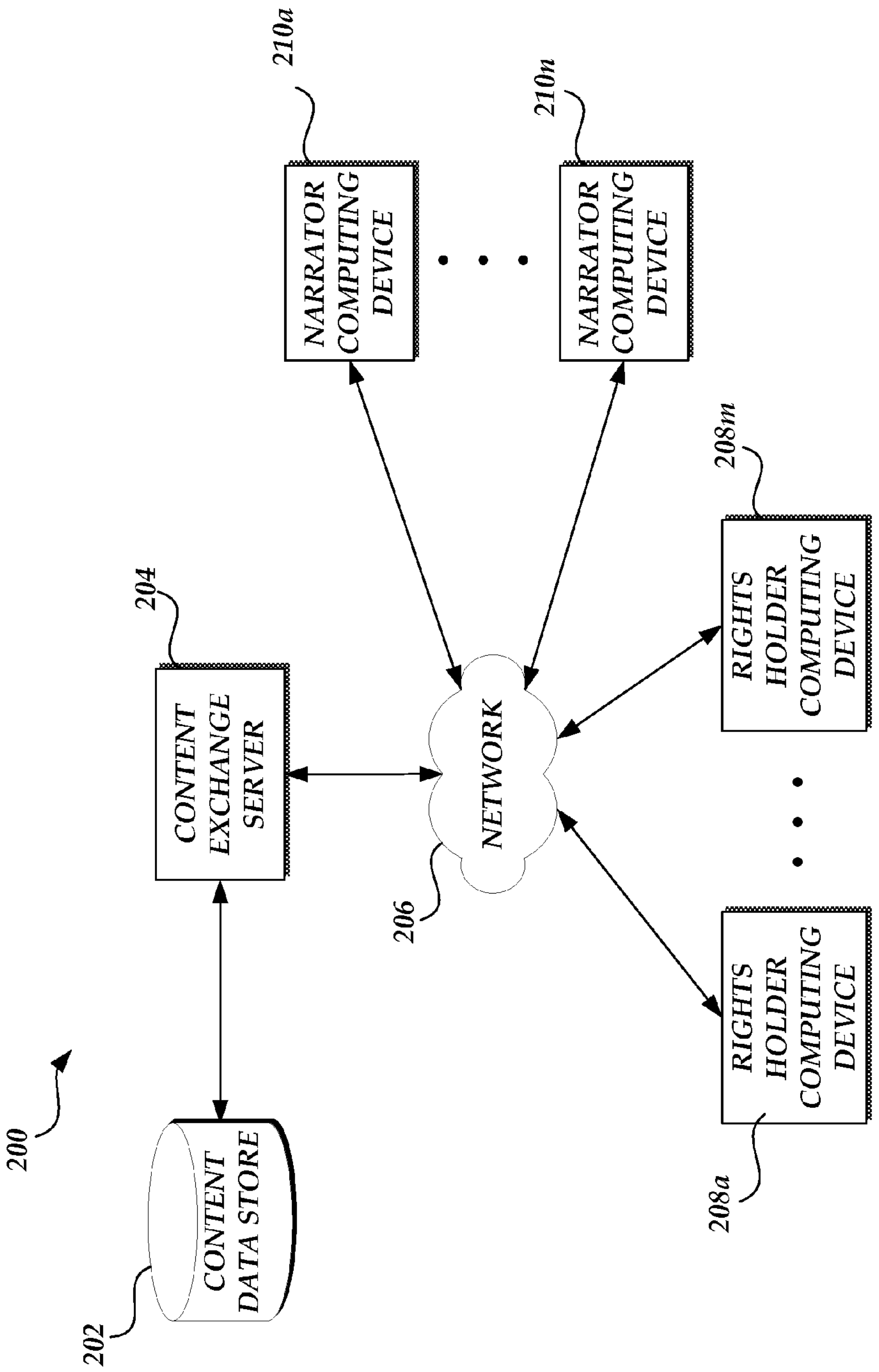
FIG. 2 is a block diagram of an illustrative operating environment for facilitating communication between narrators and a rights holder or producer.

In response, the content exchange server 204 (illustrated in FIG. 2) may generate a user interface 100 for presentation to the rights holder utilizing a computing device 208*a* as shown in FIG. 2. The user interface 100 can prompt the rights holder to provide an overview for the content and specify one or more requirements that the rights holder desires for production, including information regarding the desired recording features of the narrator.

In the illustrated embodiment, the user interface 100 includes a description 116 for the content title as well as a number of fields prompting the rights holder to input one or more requirements for production of the book "My Life in a Nutshell" in audio book form. For example, the rights holder may indicate in a field 118 the point-of-view in which the book is written (e.g., first person, third person, or both). The rights holder may also input a category or genre for the book by selecting the category or genre from a pull-down menu 120 presented in user interface 100.

The rights holder may also indicate one or more preferred vocal features of a narrator, such as gender, vocal style (e.g., mystery, sci-fi, romance, children, humor, poetry, motivational speech, corporate speech, narration, etc.), apparent age of the voice (e.g., sounds like a child, teenager, or adult), language, accent (e.g., Southern, New England, Western, British, Australian, Hispanic, etc.) and voice range or type (e.g., bass, baritone, tenor, alto, soprano) using the preferred recording features manual input 122 of the user interface 100. In the example illustrated in FIG. 1, such vocal requirements may be selected by the rights holder from various pull down menus. However, those skilled in the art will appreciate that various prompting and/or input mechanisms may be implemented without departing from the spirit and scope of the present disclosure. Moreover, those skilled in the art will recognize that more, fewer, or different vocal features may be presented in the user interface 100 for selection and/or specified by the rights holder in the content profile for the book.

Although not illustrated in FIG. 1, the recording feature manual input 122 can also provide the rights holder the ability to select additional or different recording features, such as setting features and/or production quality features, as part of the of the preferred voice sample. A setting feature selection can include the presence, or lack of, background noise, relative distance of speaker from a microphone, etc., and a background noise selection can include nature sounds, man-made sounds and/or other sounds. For example, the background noise can include any one or any combination of the ocean, rain, wind, water, trees, animals, insects, lightning, radio static, engines, talking, movement (e.g., walking, running), construction, horns, special effects, etc. The production quality feature selection can include the quality or type of the recording, such as, but not limited to, analog, digital, vinyl record, cassette tape, frequency response, sampling frequency, resolution (e.g., bits per sample), etc.

In addition, or as an alternative, to specifying the preferred recording features using the preferred recording features manual input 122 (or other input), the rights holder can upload one or more digital media files that includes an audio sample of a preferred voice using the voice sample upload portion 114 of the user interface 100. For example, the digital media files can include an audio sample of Sean Connery from "The Hunt for the Red October" and/or Mike Myers from "Shrek." As will be described in greater detail below, the content exchange server 204 can analyze the audio sample to extract the preferred recording features, which can be used to identify potential narrators. The digital media file can be any desired file format that includes audio, including, but not limited to MP3, WAV, MPEG, MKV, WMV, AVI, MP4, etc.

In some instances, the rights holder can upload multiple preferred voice samples using the voice sample upload portion 114. For example, the rights holder may like some recording features from one voice sample (e.g., accent and high sampling rate) and other recording features from another voice sample (e.g., voice type and nature sounds in the background). Alternatively, the rights holder may want to review a range of different voices, such as male and female narrators with a Southern accent, or may like a mix of two voice samples (e.g., a blended voice type and/or accent of two people, such as Sean Connery and Arnold Schwarzenegger).

Depending on the preference of the rights holder, the content exchange server 204 can use the preferred voice samples to create a range of preferred recording features (e.g., a range of pitches or voice types), use some recording features from one preferred voice sample and other recording features from a different preferred voice sample as the preferred recording features (e.g., accent from one voice sample and fundamental frequency or gender of another voice sample), and/or combine some of the recording features (e.g., average the fundamental frequency).

The rights holder can also input comments regarding the book title and/or the desired audio book in a field 124 and a script in field 126 to be used by a producer for generating an audition for producing the book as an audio book. Furthermore, the rights holder can specify whether some preferred recording features are more important than others, or how multiple voice samples are to be used. For example, the rights holder can indicate that the accent is the most important recording feature or that the gender is not an important recording feature, etc.

Based on the comments, or other input, regarding the importance of the preferred recording features, the content exchange server 204 can weight the preferred recording features. For example, if the accent is the most important preferred recording feature, audio samples from narrators with accents similar to the preferred accent can be given a higher rating than audio samples that are the same or similar in other respects, but have accents that are less similar to the preferred accent.

Once the rights holder has completed entering the desired information, the continue object 112 can be selected. In some embodiments, selecting the continue object 112 can initiate one or both of the routines 400 and 500, described in greater detail below with reference to FIGS. 4 and 5. For example, if the rights holder has uploaded one or more preferred voice samples using the voice sample upload portion 114, the content exchange server 204 can initiate routine 400 and if the rights holder has not uploaded a preferred voice sample, the content exchange server 204 can initiate routine 500.

Although the examples above are described in the context of producing an e-book or physical book in audio book form, those skilled in the art will recognize that the content exchange server 204 may be utilized to facilitate production of virtually any type of content. For example, the content may be music, commercials, podcasts, articles, films, video games, computer software, and the like in digital or physical form. Accordingly, the example set forth above (and again below) of producing an e-book or physical book in audio book form is merely illustrative and should not be construed as limiting.

In addition, a rights holder can be any individual or entity that controls the rights for producing the content. Therefore, the rights holder may be a creator or author of the content, an owner of the content, a publisher of the content, a record label, etc. or an agent (or other representative) thereof. A narrator, on the other hand, can be any individual or entity capable of vocalizing the content, such as a voice actor or actress or studio that employs voice actors and actresses.

FIG. 2 is a pictorial diagram of an illustrative networked operating environment 200 in which communication between, and production of content by, rights holders and narrators is facilitated by a content exchange server 204. As will be described in more detail below, narrators can submit via narrator computing devices 210*a*-210*n* one or more voice samples to the content exchange server 204, which can extract recording features from the voice samples. Similarly, rights holders can submit via rights holder computer devices 208*a*-208*m* preferred recording features and/or a preferred voice sample. The content exchange server 204 can extract recording features from the preferred voice sample and use the extracted recording features as the preferred recording features. Using the preferred recording features and any additional preferences set by the rights holder, the content exchange server 204 can identify potential narrators for a particular work or content of the rights holder.

The environment 200 shown in FIG. 2 includes a content exchange server 204 that facilitates communication between one or more rights holder computer devices 208*a*-208*m* (used by one or more rights holders) and one or more narrator computing devices 210*a*-210*n* (used by one or more narrators) via computer network 206. The content exchange server 204 may be embodied in a plurality of components, each executing an instance of the content exchange server 204, as described in greater detail below with reference to FIG. 3.

The rights holder computer devices 208*a*-208*m* and the narrator computing devices 210*a*-210*n* may be any computing device that is capable of communicating over computer network 206, such as a laptop or tablet computer, personal computer, personal digital assistant (PDA), hybrid PDA/mobile phone, mobile phone, electronic book reader, set-top box, camera, digital media player, and the like. In one embodiment, the rights holder computer devices 208*a*-208*m* and the narrator computing devices 210*a*-210*n* communicate with the content exchange server 204 via a communication network 206, such as the Internet or a communication link. Those skilled in the art will appreciate that the network 206 may be any wired network, wireless network, or combination thereof. In addition, the network 206 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

As noted above, the content exchange server 204 may receive data regarding a narrator (herein "a narrator profile") directly from the narrator (e.g., from a computing device 210*a* utilized by a narrator) or from other network resources, and make the narrator profile available to rights holders utilizing a rights holder computing device 208*a*-208*m* via the network 206. The narrator profile can include one or more narrator voice samples and/or narrator recording features. The content exchange server 204 may also receive data regarding a rights holder's content (herein "a content profile") directly from the rights holder (e.g., from a computing device 208*a* utilized by a rights holder) or from other network resources, and make the content profile available to narrators utilizing a narrator computing device 210*a*-210*n* via the network 206. The content profiles and narrator profiles received by the content exchange server 204 may be stored in a centralized content data store 202. For purposes of the present discussion, a "centralized" data store refers to a data store that is capable of storing data received from multiple sources. The centralized data store may be distributed or partitioned across multiple storage devices or electronic data stores (e.g., non-transitory computer-readable storage media) without departing from the spirit and scope of the present disclosure. Moreover, while the content data store 202 is depicted in FIG. 2 as being local to the content exchange server 204, those skilled in the art will appreciate that the content data store 202 may be remote to the content exchange server 204 and/or may be a network-based service itself.

Figure 3:
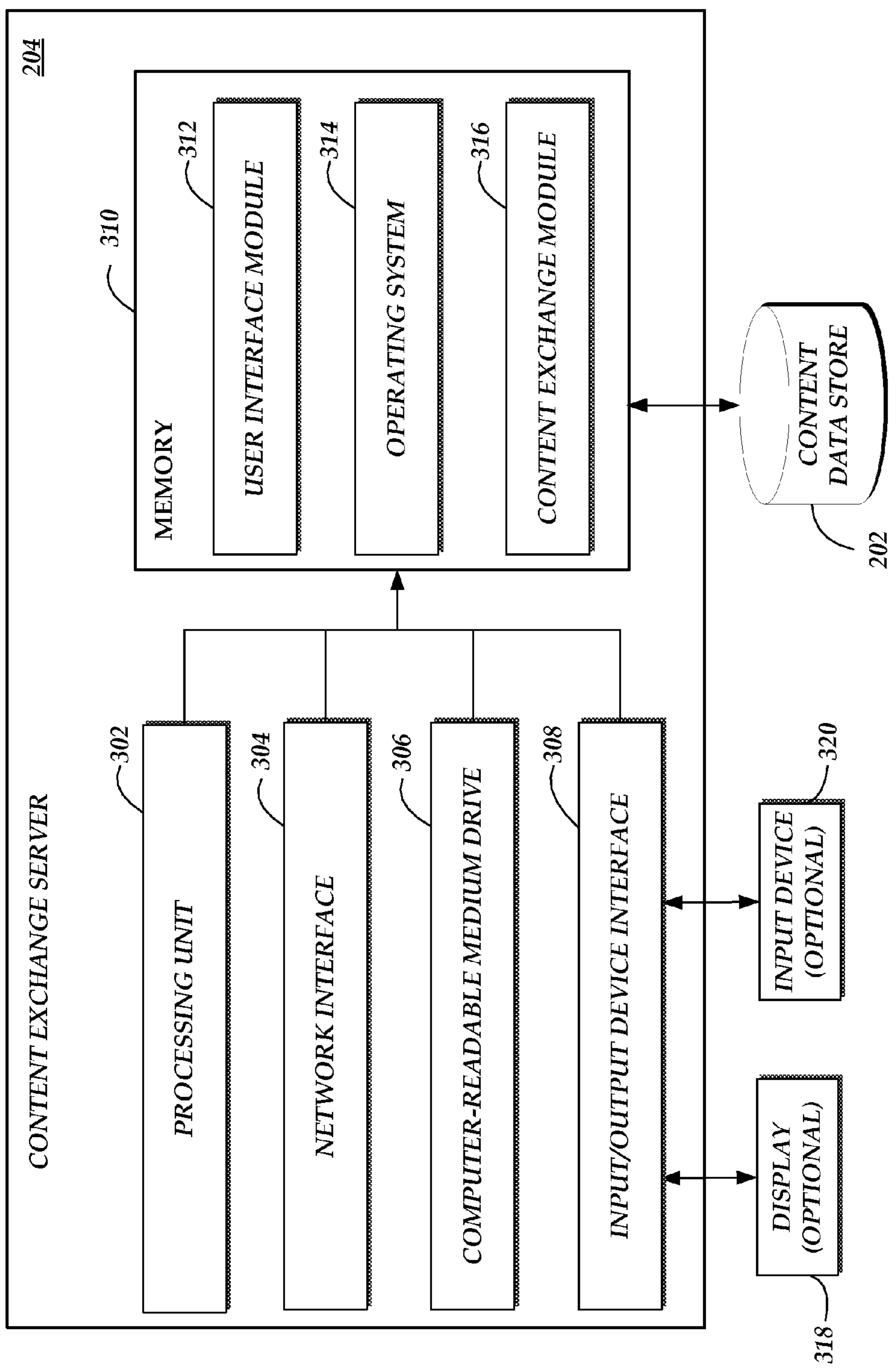
FIG. 3 is a schematic diagram of an illustrative content exchange server.

FIG. 3 is a schematic diagram of an embodiment of the content exchange server 204 shown in FIG. 2. In the illustrated embodiment, the content exchange server 204 includes an arrangement of computer hardware and software components. Those skilled in the art will appreciate that the content exchange server 204 can include more (or fewer) components than those shown in FIG. 3. It is not necessary, however, that all of these generally conventional components be shown in order to provide an enabling disclosure.

The content exchange server 204 can include a processing unit 302, a network interface 304, a non-transitory computer-readable medium drive 306, and an input/output device interface 308, all of which can communicate with one another by way of a communication bus. As illustrated, the content exchange server 204 is optionally associated with, or in communication with, an optional display 318 and an optional input device 320. The display 318 and input device 320 can be used in embodiments in which users interact directly with the content exchange server 204, such as an integrated in-store kiosk, for example. In some embodiments, the display 318 and input device 320 can be included as part of a rights holder computing device 208*a*-208*m* or a narrator computing device 210*a*-210*n*.

The network interface 304 can provide the content exchange server 204 with connectivity to one or more networks or computing systems. The processing unit 302 can thus receive information and instructions from other computing systems (such as the rights holder computing devices 208*a*-208*m* and narrator computing device 210*a*-210*n*) or services via the network 206. The processing unit 302 can also communicate to and from memory 310 and further provide output information for an optional display 318 via the input/output device interface 308.

The input/output device interface 308 can accept input from the optional input device 320, such as a keyboard, mouse, digital pen, touch screen, or gestures recorded via motion capture. The input/output device interface 308 can also output audio data to speakers or headphones (not shown).

The memory 310 contains computer-executable program instructions that the processing unit 302 can execute in order to implement one or more of the routines described below with reference to FIGS. 4 and 5. The memory 310 generally includes RAM, ROM, and/or other persistent or non-transitory computer-readable storage media. The memory 310 can store an operating system 314 that provides computer-executable program instructions for use by the processing unit 302 in the general administration and operation of the content exchange server 204. The memory 310 can further include other information for implementing aspects of the content exchange server 204. For example, in one embodiment, the memory 310 includes a user interface module 312 that facilitates generation of user interfaces (such as by providing instructions therefor) for display upon a computing device such as the rights holder computing devices 208*a*-208*m* or the narrator computing devices 210*a*-210*n*. For example, a user interface can be displayed via a navigation interface such as a web browser installed on the rights holder computing devices 208*a*-208*m* or the narrator computing devices 210*a*-210*n*. In addition, memory 310 can include or communicate with the content data store 102. Content stored in the content data store 102 can include items of textual content, items of audio and/or video content, and/or audio clips, as described in FIG. 3.

In addition to the user interface module 312, the memory 310 can include a content exchange module 316 that can be executed by the processing unit 302. In some embodiments, the content exchange module 316 can be used to implement the routines 400 and 500 described below with reference to FIGS. 4 and 5.

Those skilled in the art will recognize that in some embodiments, the content exchange server 204 can be implemented partially or entirely by the rights holder computing devices 208*a*-208*m* or the narrator computing devices 210*a*-210*n*. Accordingly, the rights holder computing devices 208*a*-208*m* or the narrator computing devices 210*a*-210*n* can include a content exchange module 316 and other components that operate similarly to the components illustrated as part of the content exchange server 204, including a processing unit 302, network interface 304, non-transitory computer-readable medium drive 306, input/output device interface 308, memory 310, user interface module 312, and so forth.

Figure 4:
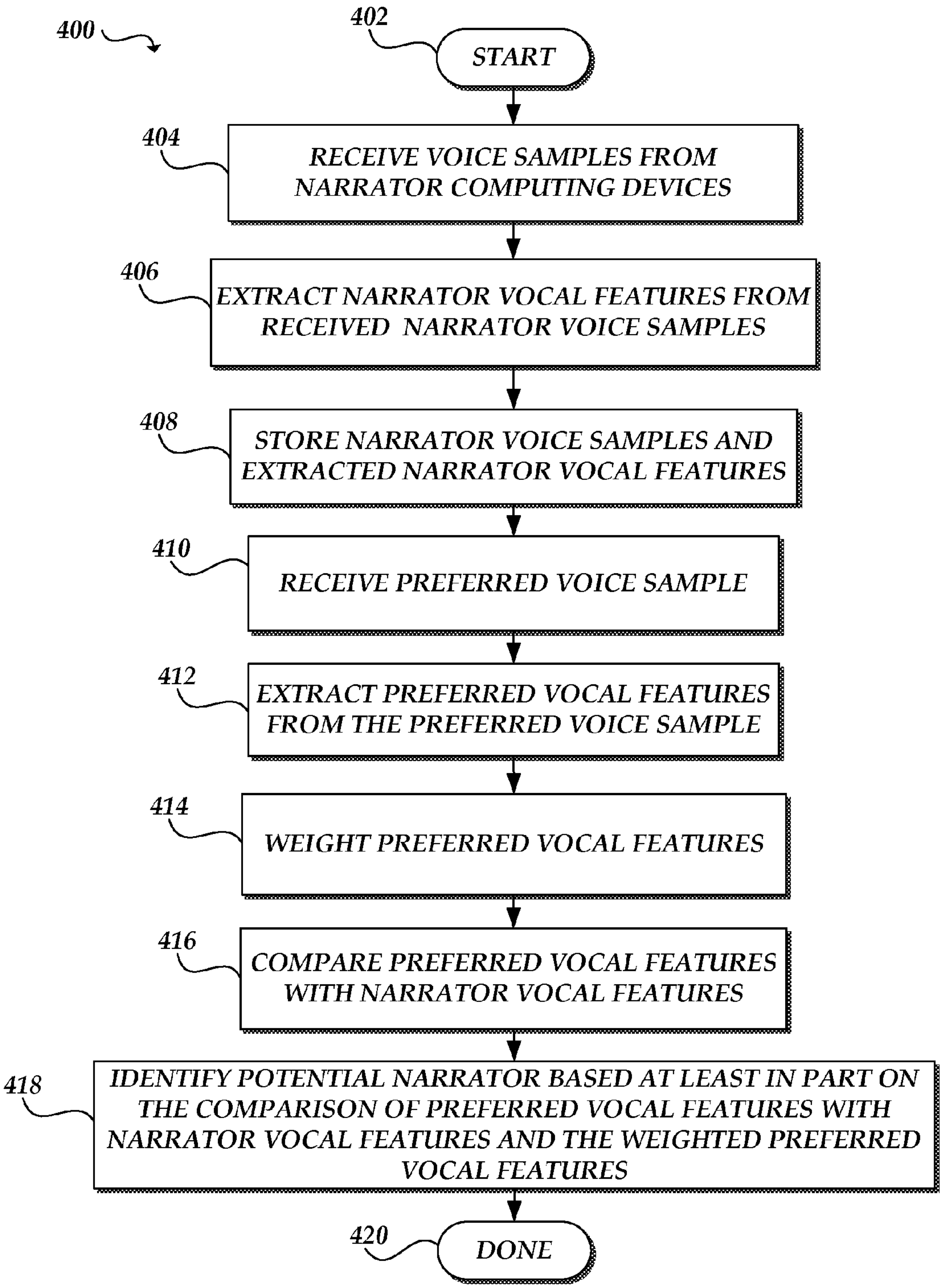
FIG. 4 is a flow diagram depicting an embodiment of a routine for identifying a narrator.

FIG. 4 is a flow diagram illustrative of a routine 400 implemented by the content exchange server 204 for identifying potential narrators for content. One skilled in the relevant art will appreciate that the elements outlined for routine 400 may be implemented by one or more computing devices/components that are associated with the content exchange server 204. For example, routine 400 can be implemented by any one or a combination of, the processing unit 302, the user interface module 312, the operating system 314, the content exchange module 315, and the like. Furthermore, the routine 400 can be implemented by any one or more of the rights holder computing devices 208*a*-208*m* or the narrator computing devices 210*a*-210*n*. However, for simplicity, routine 400 has been logically associated as being generally performed by the content exchange server 204, and the following illustrated embodiment should not be construed as limiting.

At block 402, the routine 400 begins. In some embodiments, the content exchange server 204 can initiate routine 400 after a rights holder has uploaded one or more preferred voice samples using the voice sample upload portion 114 of the user interface 100 and selected the continue object 112 of the user interface 100.

At block 404, the content exchange server 204 receives narrator voice samples from any one or more of the narrator computing devices 210*a*-210*n*. The voice samples can be received in the form of digital media files, and can be received directly from the narrator computing devices 210*a*-210*n* (or another computing device) and/or via the network 206. In some embodiments, the content exchange server 204 can receive the narrator voice samples from the content data store 202. For example, the digital media files may be from recordings, such as audiobooks, that are stored in the content data store 202.

The digital media files can be of any desired format including, but not limited to, MP3, MPEG, WAV, MKV, WMV, AVI, MP4, etc. In addition, each digital media file can include one or more audio samples from one or more narrators. For example, the digital media file can include one audio clip or multiple audio clips and each audio clip can include one voice or multiple voices from different narrators. Accordingly, the content exchange server 204 can receive multiple voice samples for one or more narrators from either one digital media file or multiple digital media files.

At block 406, the content exchange server 204 extracts narrator recording features from each of the narrator voice samples. The content exchange server 204 can extract narrator vocal features from each of the narrator voice samples using one or more speaker identification techniques, including, but not limited to, Fourier transforms including the discrete Fourier transform and fast Fourier transform, bandpass filters, discrete cosine transform, linear prediction, vector quantization, Gaussian mixture model, support vector machine, artificial neural networks, the linear prediction model, inverse filtering, closed-phase covariance analysis, parametric glottal flow model parameters, residual phase, cepstral coefficients and higher-order statistics, first- and second-order time derivative estimates, time-frequency principal components, data-driven temporal filters, temporal discrete cosine transform, frequency modulation methods, etc. Any one or any combination of the above-mentioned techniques can be used as desired.

Using the speaker identification techniques, the content exchange server 204 can identify different types of vocal features, including, but not limited to, short-term spectral features, voice source features, spectro-temporal features, prosodic features, and/or high-level features.

The short-term spectral features may include the frequency components of the narrator voice sample, a spectral envelope, which can include information regarding the resonance properties of the vocal tract, sub-band energy values, mel-frequency cepstral coefficients, spectral sub-band centroids, line spectral frequencies, perceptual linear prediction coefficients, partial correlation coefficients, log area ratios, and formant frequencies and bandwidths, etc. Short-term spectral features can be used individually or combined as desired to improve the accuracy of a comparison.

The voice source features can include, but are not limited to, the glottal pulse shape and fundamental frequency, or the rate of vocal fold vibration. The spectro-temporal features can include, but are not limited to, formant transitions, energy modulation, modulation frequency, etc. The prosodic features can include, but are not limited to, fundamental frequency, duration (e.g., pause statistics, phone duration), speaking rate, energy distributions/modulations, multi-dimensional pitch- and voicing-related features. The high-level features can include, but are not limited to, lexical features and/or word choice. In addition, the content exchange server 204 can use the accent, tone, timbre, pitch, gender, style, rhythm, syllabic emphasis, and/or cadence of the voice samples as vocal features.

The content exchange server 204 can extract any one or any combination of the vocal features described above as desired. In some embodiments, the content exchange server 204 extracts only a subset of the above-described features from the voice samples.

In addition, the content exchange server 204 can extract setting features and production quality features from the voice samples. As mentioned previously, the setting can refer to characteristics of the voice sample that are attributable to the location where the voice sample was recorded and/or to features added after the voice sample was recorded. The characteristics can include background noise, relative or approximate distance from the microphone, and/or special effects (e.g., sounds added post-recording), etc. The production quality can refer to the quality or type of the recording used to make the voice sample, such as, but not limited to, sampling frequency, analog or digital, frequency response, etc.

Similar to the manner in which the content exchange server 204 can extract the vocal features, the content exchange server 204 can extract the setting features and production quality features from the voice samples. For example, with regard to the setting features, the content exchange server 204 can extract the spectral envelope, pitch, fundamental frequency of sounds or voices other than the primary voice (the voice of the narrator that is associated with the voice sample being analyzed) in the voice sample. In addition, the content exchange server 204 can compare the harmonic and subharmonic frequencies to extract a relative distance of the primary voice in the voice sample from the microphone. Furthermore, with regard to the production quality features, the content exchange server 204 can extract the presence of wow and flutter in the voice sample, frequency response of the voice sample, sampling frequency of the voice sample, and/or resolution (e.g., bits per sample) of the voice sample, etc.

At block 408, the content exchange server 204 stores the narrator voice samples and the extracted narrator recording features. The content exchange server 204 can store the narrator voice samples and the extracted narrator recording features at the content data store 202. In addition, the content exchange server 204 can associate the various voice samples and corresponding recording features with a corresponding narrator profile containing information regarding an individual narrator. Accordingly, if a narrator submits multiple voice samples, each of the voice samples can be associated with the corresponding narrator profile. In some embodiments, the content exchange server 204 stores only one of the narrator recording features and the narrator voice samples and does not store the other. When only the narrator voice samples are stored, the narrator recording features can be extracted during a comparison with preferred recording features, as described in greater detail below with reference to block 416.

At block 410, the content exchange server 204 receives a preferred voice sample from a rights holder computing device 208*a*-208*m*. Similar to the manner in which the content exchange server 204 receives the narrator voice samples, the content exchange server 204 can receive a digital media file including a preferred voice sample from a rights holder computing device 208*a*-208*m*, another computing device, or the content data store 202. In some instances, the digital media file can include multiple voice samples and one of the voice samples can be selected as the preferred voice sample. For example, if the media file includes an audio clip with two voices, a user can select which of the voices should be used as the preferred voice sample.

In some cases, the content exchange server 204 can receive multiple preferred voice samples from a rights holder computing device 208*a*-208*m*. For example, if a rights holder wants to review a variety of different voices (e.g., male and female) or wants to provide multiple examples of a desired sound (e.g., multiple samples of British accents) to focus the search, she can provide multiple audio samples to the content exchange server 204. Furthermore, in some embodiments, the voices of the preferred voice samples do not correspond to the voices associated with narrator profiles stored in the content data store 202. For example, the preferred voice sample may be of Sean Connery, but Sean Connery may not have a narrator profile stored in the content data store 202. In certain embodiments, the voices of the preferred voice samples do correspond to the voices associated with narrator profiles stored in the content data store 202.

At block 412, the content exchange server 204 extracts preferred recording features from the preferred voice sample, such as but not limited to vocal features, setting features, and/or the production quality features. As described in greater detail above with reference to block 406, the content exchange server 204 can extract from the preferred voice sample a variety of recording features, including vocal features, setting features, and/or production quality features, using various techniques. The recording features extracted from the preferred voice samples can be used by the content exchange server 204 as the preferred recording features. In addition, the preferred recording features received via the preferred recording features manual input 122 can be used in conjunction with the preferred recording features extracted from the preferred voice samples. For example, the preferred recording features received via the preferred recording features manual input 122 can supplement the extracted preferred recording features, or vice versa, and/or may include preferred recording features that cannot be extracted, or are difficult to extract, from voice samples.

For consistency, the content exchange server 204 can extract the same recording features from the preferred voice sample that were extracted from the narrator voice samples. However, it will be understood that the content exchange server 204 can extract fewer, more, or different recording features from the preferred voice sample than the narrator voice samples, as desired. For example, in some instances, the content exchange server 204 may have extracted different features from different narrator voice samples (e.g., fundamental frequency and accent in some narrator voice samples and timbre and spectral envelope in other narrator voice samples). In such cases, the content exchange server 204 can extract the fundamental frequency, accent, timbre, and spectral envelope from the preferred voice sample in order to be able to compare the different voice samples with the preferred voice sample.

In addition, if multiple preferred voice samples are provided, the content exchange server 204 can extract the recording features from each of the preferred voice samples. The content exchange server 204 can use the preferred recording features from the different preferred voice samples as a range of preferred recording features, use some recording features from each preferred voice sample as the preferred recording features, and/or combine the recording features from each of the preferred voice samples, as desired.

With respect to using the preferred recording features as a range, the content exchange server 204 can use a recording feature from different voice samples (or the two extreme recording features if more than two voice samples are used) to generate the range. For example, if the voice samples include a bass voice and an alto voice at either end, the content exchange server 204 can generate a range from bass (or a corresponding frequency) to alto (or a corresponding frequency).

With respect to using some recording features from each preferred voice sample as the preferred recording features, the content exchange server 204 can rely on input from the rights user to determine which recording features from which preferred voice samples are to be used. For example, if the rights user likes the accent of Matthew McConaughey in "Mud" but the voice type of Amy Adams in "Enchanted", the content exchange server 204 can use the accent of Matthew McConaughey as the preferred accent and the voice type of Amy Adams as the preferred voice type.

Similarly, the content exchange server 204 can combine recording features as desired by the rights user. For example, if the rights user likes the combined voice of Ian McKellen and Christopher Lee from "Lord of the Rings," the content exchange server 204 can average the corresponding recording features, such as fundamental frequency, pitch, and/or cadence from different voice samples (or combine them in some other way) to obtain the preferred recording features. Any combination of the aforementioned use of recording features to generate preferred recording features can be used as desired.

At block 414, the content exchange server 204 weights the preferred recording features. As mentioned previously, the rights holder can determine that some recording features are more important than others. Accordingly, the content exchange server 204 can weight the preferred recording features based on the preferences of the rights holder. The content exchange server 204 can weight each preferred recording feature differently and/or can weight some preferred recording features the same. For example, the rights holder may indicate that the apparent age of the voice is the most important recording feature and the content exchange server 204 can weight it more than the other preferred recording features. Alternatively, the content exchange server 204 can rank each preferred recording feature differently, and weight the preferred recording features based at least in part on their rank. In certain embodiments, all the preferred recording features can be weighted equally or not weighted at all.

At block 416, the content exchange server 204 compares the preferred recording features with the narrator recording features. In some embodiments, such as when a preferred recording feature includes a range, the corresponding narrator recording feature can be compared with the range. In certain embodiments, such as when only one preferred recording feature is used, each preferred recording feature can be compared with each corresponding narrator recording feature (e.g., preferred fundamental frequency compared with narrator fundamental frequency). In some instances, such as when multiple preferred recording features are used, each preferred recording feature can be compared with a corresponding recording feature of multiple narrator voice samples. In some embodiments, some preferred recording features can be used to quickly eliminate a number of narrators. For example, if the preferred gender is female, the content exchange server 204 can eliminate all male narrators as potential narrators and compare any remaining preferred recording features with recording features from female narrators.

During the comparison, the content exchange server 204 can determine whether the narrator recording feature satisfies a recording feature threshold with respect to the corresponding preferred recording feature. In some embodiments, such as when gender is the relevant preferred recording feature, the recording feature threshold can be an exact match. In certain embodiments, such as when fundamental frequency is the relevant preferred recording feature, the recording feature threshold can be an approximation of the preferred recording feature, or a range. However, it will be understood that the content exchange server 204 can use any recording feature threshold for any recording feature as desired.

Additionally, the content exchange server 204 can track the similarity between each of the preferred recording features and the narrator recording features of the narrator voice samples that are compared. In some cases, the content exchange server 204 can assign a score for each narrator voice sample based on the comparison of the preferred recording features with the narrator recording features of the narrator voice sample. For example, narrator recording features that match, satisfy the preferred vocal threshold of the corresponding preferred recording feature, or are more similar to (or more closely approximate) the preferred recording feature, can receive a higher score than narrator recording features that do not, or are not. The scores for individual narrator recording features can be aggregated to determine the score for a particular narrator voice sample.

Furthermore, the content exchange server 204 can use the weighting of the different preferred recording features during the comparison. The content exchange server 204 can use the weighting in a variety of ways during the comparison. In some instances, for preferred recording features that are weighted more heavily, the content exchange server 204 can use a smaller recording feature threshold or range during the comparison.

In some embodiments, the content exchange server 204 can use the preferred recording features that are weighted more heavily as a first filter during the comparison. Preferred recording features that are weighted less heavily can be compared later on during the comparison process or to rank the remaining voice samples. For example, if accent is weighted as the most important, fundamental frequency is weighted second most important, and gender is weighted not very important, the content exchange server 204 can review the accent of the narrator voice samples and eliminate all narrator voice samples that do not satisfy an accent threshold. The content exchange server 204 can then review the fundamental frequency of the remaining narrator voice samples and can either remove the narrator voice samples that do not satisfy a fundamental frequency threshold or increase the ranking of the remaining narrator voice samples that do satisfy the fundamental frequency threshold. If desired, the fundamental frequency threshold can be normatively more generous or larger than the accent threshold. Finally, the content exchange server 204 can indicate which of the remaining narrator voice samples satisfy a gender threshold, such as by highlighting, etc. In this manner, the content exchange server 204 treats the accent as the most important and uses the remaining preferred recording features to help rank or identify the narrator voice samples.

In certain embodiments, if a narrator recording feature satisfies the recording feature threshold of a corresponding preferred recording feature that is weighted more heavily, the narrator voice sample can be rated higher than it otherwise would have been, etc. For example, if the preferred recording features include cadence, age of voice and vocal style, and the cadence is the most important, the content exchange server 204 can use the cadence for 50% of the overall score of the narrator vocal samples and can use the age of voice and vocal style for 25% each of the overall score. Similarly, if the preferred recording features are ranked in order of importance as cadence, age of voice, and vocal style, the content exchange server 204 can use cadence for 50% of the overall score and use age of voice and vocal style for 30% and 20%, respectively. In embodiments where the preferred recording features are weighted equally (or not at all), the cadence, age of voice, and vocal style can each be used to determine 33.33% of the overall score, etc. It will be understood that the content exchange server 204 can use any percentage or weight as desired and can provide a rights holder the ability to weight the different preferred recording features as desired.

At block 418, the content exchange server 204 identifies potential narrators. The potential narrators can be identified based at least in part on the comparison of the preferred recording features and the narrator recording features of the narrator voice samples. For example, the content exchange server 204 can identify the narrators that correspond to the highest ranked or scored narrator voice samples as potential narrators. As mentioned previously, the scores and/or rankings can be based at least in part on the comparisons of the individual recording features as well as the weighting of preferred recording features.

As mentioned previously, in some embodiments, the content exchange server 204 identifies a narrator with a voice that is similar to the voice from the preferred voice sample. In such embodiments, the person from the preferred voice sample may not be associated with a narrator profile stored in the content data store 202. Accordingly, the content exchange server 204 identifies a narrator with a voice that is similar to the voice from the preferred voice sample, but who is different. For example, the preferred voice sample may be of James Earl Jones, and the rights holder is looking to find a narrator with a voice that is similar to James Earl Jones, but who is not James Earl Jones.

In some situations, at block 416 and/or 418, the content exchange server 204 can remove narrators from the list of potential narrators when all of the preferred recording features match all of the narrator recording features, or when the content exchange server 204 otherwise determines that the person whose voice is in the preferred voice sample is the same as the potential narrator. In some cases, such as when a rights holder is looking for someone with a similar voice but who is different from the person whose voice is in the preferred voice sample, it may be undesirable to have the content exchange server 204 identify the person whose voice is on the preferred voice sample as a potential narrator. For example, a rights holder may be looking for an alternative to a particular narrator, and merely wants to identify someone else with a similar sound as the particular narrator. In such cases, if the content exchange server 204 determines that the person whose voice is on the preferred voice sample is the same as the potential narrator, the results of the potential narrator can be removed.

However, it will be understood that in certain embodiments, the content exchange server 204 does not remove a potential narrator from the results when all of the preferred recording features match all of the narrator recording features, or when the content exchange server 204 determines that the person whose voice is on the preferred voice sample is the same as the potential narrator. For example, if all of the preferred recording features match all of the narrator recording features, it may indicate that the potential narrator is a good replacement for the voice from the preferred voice sample, or the rights holder may be attempting to identify the person from the preferred voice sample.

At block 420, the routine 400 ends. It will be understood that fewer, more, or different blocks can be used as part of routine 400. In some instances, the various blocks of routine 400 can be performed in a different order or performed simultaneously. In some embodiments, blocks 410 and 412 can be replaced with a single block for receiving preferred recording features. For example, in embodiments, where a rights holder does not provide a preferred voice sample using the voice sample upload portion 114 of the user interface 100, but merely provides preferred recording features, blocks 410 and 412 can be omitted. In such embodiments, the rights holder can provide the preferred recording features using the preferred recording features manual input 122 of the user interface 100.

Similarly, blocks 406 and 408 can be omitted in embodiments where narrators provide the narrator recording features without providing a narrator voice sample. For example, the narrators can provide information regarding their recording features, such as, but not limited to, accents, fundamental frequency (or range), timbre, gender, voice types, etc. The content exchange server 204 can use the narrator recording features provided by the narrators as opposed to extracting the narrator recording features from narrator voice samples. In such embodiments, the content exchange server 204 can convert qualitative narrator recording features to quantitative recording features as desired.

In addition, as mentioned previously, in certain embodiments the preferred recording features are not weighted. In such embodiments, block 414 can be omitted. In some embodiments, blocks 416 and 418 can be combined such that the potential narrators are identified during the comparison. In certain embodiments, the routine 400 can include an additional block for presenting the results of the identification to the rights holder. It will be understood that any combination of the above-described embodiments can be used as desired.

Figure 5:
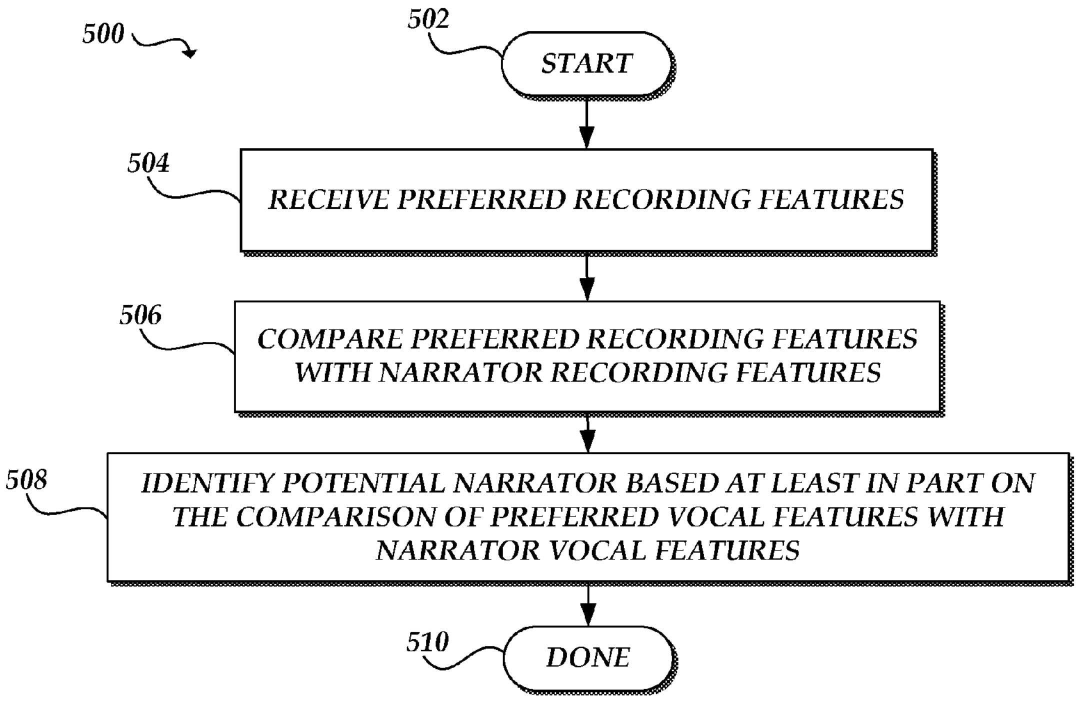
FIG. 5 is a flow diagram depicting another embodiment of a routine for identifying a narrator.

FIG. 5 is a flow diagram illustrative of a routine 500 implemented by the content exchange server 204 for identifying potential narrators for content. One skilled in the relevant art will appreciate that the elements outlined for routine 500 may be implemented by one or more computing devices/components that are associated with the content exchange server 204. For example, routine 500 can be implemented by any one or a combination of, the processing unit 302, the user interface module 312, the operating system 314, the content exchange module 315, and the like. Furthermore, the routine 500 can be implemented by any one or more of the rights holder computing devices 208*a*-208*m* or the narrator computing devices 210*a*-210*n*. However, for simplicity, routine 500 has been logically associated as being generally performed by the content exchange server 204, and the following illustrated embodiment should not be construed as limiting.

At block 502, the routine 500 begins. In some embodiments, the content exchange server 204 can initiate routine 500 after a rights holder has provided preferred recording feature information via the preferred recording features manual input 122 (but has not uploaded any preferred voice samples using the voice sample upload portion 114) and has selected the continue object 112 of the user interface 100. In certain embodiments, the content exchange server 204 can initiate routine 500 after preferred recording features have been extracted from a preferred voice sample, as described previously.

At block 504, the content exchange server 204 receives one or more preferred recording features. As described previously, the preferred recording features can be provided to the content exchange server 204 via the preferred recording features manual input 122 of the user interface 100. In this manner, the content exchange server 204 can receive one or more preferred recording features. In some embodiments, the content exchange server 204 can convert any qualitative preferred recording features received via the preferred recording features manual input 122 to a quantitative preferred recording feature. For example, if the content exchange server 204 receives "baritone" as a preferred voice type, the content exchange server 204 can convert "baritone" to a particular fundamental frequency or frequency range. Similarly, other qualitative preferred recording features can be converted to quantitative preferred recording features depending on the type of speech recognition techniques being used by the content exchange server 204. In addition, similar to the method described above with reference to routine 400, the content exchange server 204 can receive the one or more preferred recording features after they have been extracted from a preferred voice sample.

At block 506, the content exchange server 204 compares the preferred recording features with narrator recording features, which can be stored in the content data store 202. The narrator recording features can correspond to recording features extracted from narrator voice samples and/or can correspond to recording features provided by narrators, as described in greater detail above. For example, narrators can provide information regarding their recording features, such as voice type, gender, fundamental frequency range, timbre, accents, etc. The content exchange server 204 can compare the narrator recording features similar to the manner described above with respect to block 416 of FIG. 4. As mentioned previously, the content exchange server 204 can compare a single preferred recording feature with a corresponding narrator recording feature from different narrator vocal samples, multiple preferred recording features with corresponding narrator recording features, etc. In addition, in some embodiments, the content exchange server 204 can use weighted preferred recording features during the comparison.

At block 508, the content exchange server 204 identifies at least one potential narrator from a database storing profiles of narrators, based at least in part on the comparison of the preferred recording features with narrator recording features. As described previously with respect to block 418 of FIG. 4, the potential narrator can correspond to the narrator voice sample that receives the highest score and/or includes narrator recording features that are most similar to the preferred recording features.

At block 510, the routine 500 ends. It will be understood that fewer, more, or different blocks can be used as part of routine 500. In some instances, the various blocks can be performed in a different order or performed simultaneously. In some embodiments, blocks 506 and 508 can be combined, such that the content exchange server 204 compares the preferred recording features with the narrator recording features and identifies the at least one potential narrator in a single block. In certain embodiments, the routine 500 can include an additional block for presenting the results of the identification to the rights holder. It will be understood that any combination of the aforementioned embodiments can be used as desired.

Furthermore, it will be understood that any one or any combination of the blocks of routine 500 can be used in conjunction with routine 400, or vice versa, as desired. For example, in some embodiments, such as when a rights holder uploads one or more preferred voice samples using the voice sample upload portion 114, routine 500 can include (and/or replace block 504 with) blocks 410 and 412 of routine 400. Similarly, in embodiments of routine 400 where the content exchange server 204 receives qualitative preferred recording features, the content exchange server 204 can convert the qualitative preferred recording features to quantitative preferred recording features.

Although described with respect to identifying narrators, it will be understood that the concepts described herein can be used in a variety of applications. For example, following the selection of a narrator, the content exchange server 204 can be used to verify that the selected narrator is able to record the work similar to the narrator recording features and/or narrator voice sample used to select the narrator (the "audition recording features") and/or the preferred voice sample.

In this regard, the content exchange server 204 can receive a new voice sample of the selected narrator. In some cases, the new voice sample can correspond to at least a portion of the work that is being recorded. The content exchange server 204 can extract one or more recording features from the new voice sample and compare the extracted recording features with corresponding audition recording features and/or the preferred voice sample.

Based on the comparison, the content exchange server 204 can point out the differences and provide suggestions. For example, the content exchange server 204 can indicate that the fundamental frequency of the new voice sample is too high or low with respect to the preferred voice sample, the narrator is too close or too far away from the microphone and/or that the background noise should be adjusted (e.g., increased, decreased, use different sounds, etc.). In addition, the content exchange server 204 can determine whether voice samples from other narrators that weren't selected previously are a better match than the new voice sample and alert the rights holder if there is a better match. In another embodiment, the new voice sample can be added to the narrator's profile, and the content exchange server 204 can perform routines 400 or 500 to determine whether the new voice sample is the closest or best match to the preferred voice sample, and alert the rights holder if it is not.

As yet another example, if an audiobook owner indicates that they like the voice of Narrator A, the content exchange server 204 can identify other books that are narrated by narrators with recording features that are similar to Narrator A (in addition to other books narrated by Narrator A), and provide corresponding audiobook recommendations to the audiobook owner. Similarly, if a rights holder likes the voice of Narrator A, but does not know Narrator A's identity, the rights holder can user the content exchange server 204 to identify Narrator A or other narrators with a similar voice or sound.

In addition, if Narrators A, B, and C, are the top-ranked narrators, the content exchange server 204 can compare their voices to identify similar recording features, and then provide suggestions to other narrators to improve their performance or increase their ranking. Furthermore, rights holders, producers, and/or agents can use content exchange server 204 to identify low-cost narrators that have recording features similar to high-cost narrators or voice actors/actresses, or other narrators with whom the rights holder, producer, and/or agent would like to work.

In some embodiments, it will be appreciated that disclosed herein are systems and methods that enable the determination and/or navigation of media content through various user interactions. For example, a click, tap, swipe, slide, double tap, tap and hold, pinching, scrunching, expanding, zooming, other user interactions or input, and/or some combination thereof may be used to navigate various levels of media content. In some embodiments, pinching and/or expanding may change one or more levels of media content based on the relative degree of the motion and/or interaction. For example, a relative large zoom motion may change more than one level and/or a relative small zoom motion may change only one level.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method, comprising:

under control of one or more computing devices:

receiving a plurality of digital media files, each of the digital media files comprising a narrator voice sample of a plurality of narrator voice samples, wherein the plurality of digital media files are submitted by or on behalf of narrators of books;

extracting narrator vocal features, including timbre and fundamental frequency, from each narrator voice sample of the plurality of narrator voice samples;

storing the plurality of narrator voice samples and the narrator vocal features of each narrator voice sample in an electronic data store;

associating a particular narrator voice sample and the narrator vocal features of the particular narrator voice sample with a profile of a potential narrator, wherein the electronic data store comprises a plurality of profiles of potential narrators;

receiving a digital media file comprising a preferred voice sample, wherein the digital media file is submitted by or on behalf of a holder of rights in a book, and wherein the preferred voice sample is different from the plurality of narrator voice samples stored in the electronic data store;

extracting preferred vocal features, including timbre and fundamental frequency, from the preferred voice sample;

assigning a weight to each preferred vocal feature within the preferred vocal features;

conducting a comparison of each preferred vocal feature of the preferred vocal features and a corresponding narrator vocal feature of each narrator voice sample of the plurality of narrator voice samples;

identifying a group of potential narrators from the plurality of potential narrators from at least the weight assigned to each preferred vocal feature of the preferred vocal features and the comparison of each preferred vocal feature of the preferred vocal features and the corresponding narrator vocal feature, wherein the group of potential narrators are different from a person that corresponds to the preferred voice sample; and causing a computing device to display the identified group of potential narrators.

2. The computer-implemented method of claim 1, wherein extracting the narrator vocal features comprises extracting at least one of a narrator short-term spectral feature, a narrator voice source feature, a narrator spectro-temporal feature, a narrator prosodic feature, and a narrator high-level feature, and wherein extracting the preferred vocal features comprises extracting at least one of a preferred short-term spectral feature, a preferred voice source feature, a preferred spectro-temporal feature, a preferred prosodic feature, and a preferred high-level feature.

3. The computer-implemented method of claim 1, wherein the electronic data store comprises narrator voice samples from at least one thousand potential narrators.

4. A computer-implemented method, comprising:

under the control of one or more computing devices:

receiving a digital media file comprising a preferred voice sample, wherein the digital media file is submitted by or on behalf of a holder of rights in a work;

receiving information specifying a type of recording feature within the digital media file to assign as a preferred recording feature for a narrator of the work;

determining, from the digital media file, a recording feature of the digital media file that corresponds to the type of recording feature;

assigning the recording feature of the digital media file as the preferred recording feature for the narrator of the work;

conducting a comparison of the preferred recording feature and a plurality of narrator recording features stored in an electronic data store;

identifying a potential narrator for the work from a plurality of potential narrators from at least the comparison of the preferred recording feature and the plurality of narrator recording features; and transmitting, to a computing device associated with the holder of rights in the work, information facilitating display, by the computing device, of indication of the potential narrator for the work.

5. The computer-implemented method of claim 4, wherein determining the recording feature of the digital media file comprises extracting, from the digital media file, at least one of a short-term spectral feature, a voice source feature, a spectro-temporal feature, a prosodic feature, and a high-level feature.

6. The computer-implemented method of claim 4, wherein determining the recording feature of the digital media file comprises extracting, from the digital media file, the recording feature using at least one of vector quantization, Gaussian mixture model, support vector machine, and artificial neural networks.

7. The computer-implemented method of claim 4, determining the recording feature of the digital media file comprises extracting, from the digital media file, at least one of background noise, distance from microphone, special effects, sampling frequency, and frequency response, and resolution.

8. The computer-implemented method of claim 4, wherein the plurality of narrator recording features comprise narrator recording features of at least one thousand potential narrators.

9. The computer-implemented method of claim 4, wherein the preferred recording feature comprises at least one of accent, tone, timbre, fundamental frequency, speed, pause, pitch, gender, style, and cadence.

10. The computer-implemented method of claim 4 further comprising extracting each of the plurality of narrator recording features from a distinct audio sample.

11. The computer-implemented method of claim 4, wherein the preferred recording feature comprises a plurality of preferred recording features, and wherein conducting the comparison of the preferred recording feature and the plurality of narrator recording features stored in the electronic data store comprises comparing each preferred recording feature of the plurality of preferred recording features with a corresponding narrator recording feature of the plurality of narrator recording features.

12. The computer-implemented method of claim 11 further comprising:

receiving an indication of weights to be assigned to the plurality of recording features; and weighting the plurality of preferred recording features according to the weights;

wherein the weighting of the plurality of preferred recording features is utilized in identifying the potential narrator for the work.

13. A system, comprising:

an electronic data store storing a plurality of narrator profiles, each narrator profile including at least one narrator recording feature extracted from a narrator voice sample; and one or more hardware computing devices in communication with the electronic data store, and configured to at least:

receive a digital media file comprising a preferred voice sample, wherein the digital media file is submitted by or on behalf of a holder of rights in a work;

obtain information specifying a type of recording feature within the digital media file to assign as a preferred recording feature for a narrator of the work;

determine a recording feature of the digital media file that corresponds to the type of recording feature;

assign the recording feature of the digital media file as the preferred recording feature for the narrator of the work;

conduct a comparison of the preferred recording feature and the at least one narrator recording feature included in each of the plurality of narrator profiles;

identify a potential narrator for the work from the plurality of narrator profiles from at least the comparison of the preferred recording feature and the at least one narrator recording feature included in each of the plurality of narrator profiles; and transmit, to a computing device associated with the holder of rights in the work, information facilitating display, by the computing device, of an indication of the potential narrator for the work.

14. The system of claim 13, wherein to determine a recording feature of the digital media file, the one or more hardware computing devices is configured to extract, from the digital media file, at least one of a short-term spectral feature, a voice source feature, a spectro-temporal feature, a prosodic feature, and a high-level feature.

15. The system of claim 13, wherein to determine a recording feature of the digital media file, the one or more hardware computing devices is configured to extract, from the digital media file, the preferred recording feature using at least one of vector quantization, Gaussian mixture model, support vector machine, and artificial neural networks.

16. The system of claim 13, wherein the plurality of narrator profiles comprise at least one thousand narrator profiles.

17. The system of claim 13, wherein the preferred recording feature comprises at least one of accent, tone, timbre, fundamental frequency, speed, pause, pitch, gender, style, and cadence.

18. The system of claim 13, wherein the preferred recording feature comprises a plurality of preferred recording features, and wherein, to conduct the comparison of the preferred recording feature and the plurality of narrator recording features stored in the electronic data store, the one or more hardware computing devices are configured to compare each recording feature of the plurality of recording features with a corresponding narrator recording feature included in individual narrator profiles of the plurality of narrator profiles.

19. The system of claim 18, wherein the one or more hardware computing devices are further configured to assign a weight to each preferred recording feature of the plurality of preferred recording features, and wherein the one or more hardware computing devices are further configured to utilize the weight assigned to each preferred recording feature to identify the potential narrator for the work.

20. A computer-readable, non-transitory storage medium storing computer executable instructions that, when executed by one or more computing devices, configure the one or more computing devices to perform operations comprising:

receiving a digital media file comprising a preferred voice sample, wherein the digital media file is submitted by or on behalf of a holder of rights in a work;

obtaining information specifying a type of recording feature within the digital media file to assign as a preferred recording feature for a narrator of the work;

determining a recording feature of the digital media file that corresponds to the type of recording feature;

assigning the recording feature of the digital media file as the preferred recording feature for the narrator of the work;

conducting a comparison of the preferred recording feature and a plurality of narrator recording features stored in an electronic data store, each of the plurality of narrator recording features being extracted from a distinct audio sample;

identifying a potential narrator for the work from a plurality of potential narrators from at least the comparison of the preferred recording features and the plurality of narrator recording features; and transmitting, to a computing device associated with the holder of rights in the work, information facilitating display, by the computing device, of an indication of the potential narrator for the work.

21. The computer-readable, non-transitory storage medium of claim 20, wherein each of the plurality of narrator recording features is extracted from a distinct audio sample using at least one of vector quantization, Gaussian mixture model, support vector machine, and artificial neural networks.

22. The computer-readable, non-transitory storage medium of claim 20, wherein the at least one preferred recording feature comprises at least one of accent, tone, timbre, fundamental frequency, speed, pause, pitch, gender, style, and cadence.

23. The computer-readable, non-transitory storage medium of claim 20, wherein the preferred recording feature comprises a plurality of preferred recording features, and wherein conducting the comparison of the preferred recording feature and the plurality of narrator recording features stored in the electronic data store comprises comparing each recording feature of the plurality of recording features with a corresponding narrator recording feature of the plurality of narrator recording features.

24. The computer-readable, non-transitory storage medium of claim 23, further comprising weighting the plurality of preferred recording features, and wherein the weighting of the plurality of preferred recording features is utilized in identifying the potential narrator for the work.

* * * * *